(12) United States Patent
Humphreys et al.

(10) Patent No.: US 10,118,826 B2
(45) Date of Patent: *Nov. 6, 2018

(54) OXYGEN GENERATORS

(71) Applicant: MOLECULAR OXYGEN LIMITED, Essex (GB)

(72) Inventors: Mandy Humphreys, Cambridge (GB); Peter Hutchinson, Essex (GB)

(73) Assignees: Molecular Oxygen Limited, Harlow, Essex (GB); Molecular Products Limited, Harlow, Essex (GB)

( * ) Notice: Subject to any disclaimer, the term of this patent is extended or adjusted under 35 U.S.C. 154(b) by 176 days.

This patent is subject to a terminal disclaimer.

(21) Appl. No.: 15/103,874

(22) PCT Filed: Dec. 11, 2014

(86) PCT No.: PCT/GB2014/053667
§ 371 (c)(1),
(2) Date: Jun. 12, 2016

(87) PCT Pub. No.: WO2015/087077
PCT Pub. Date: Jun. 18, 2015

(65) Prior Publication Data
US 2016/0318762 A1    Nov. 3, 2016

(30) Foreign Application Priority Data

Dec. 12, 2013 (GB) .................................. 1321996.9

(51) Int. Cl.
*C01B 13/02* (2006.01)

(52) U.S. Cl.
CPC ...... *C01B 13/0296* (2013.01); *C01B 13/0218* (2013.01)

(58) Field of Classification Search
CPC .. C01B 13/0296; C01B 13/0218; C01B 13/02
(Continued)

(56) References Cited

U.S. PATENT DOCUMENTS 3,443,907 A * 5/1969 Mausteller .......... C01B 13/0296
102/530
5,620,664 A * 4/1997 Palmer .................. A62B 25/00
422/120

(Continued)

FOREIGN PATENT DOCUMENTS

| | | |
|---|---|---|
| EP | 0736486 A2 | 10/1996 |
| WO | WO 9710025 | 3/1997 |

(Continued)

OTHER PUBLICATIONS

International Search and Written Opinion for PCT/GB2014/053667 dated Mar. 18, 2015, 8 pp.

*Primary Examiner* — Huy Tram Nguyen
(74) *Attorney, Agent, or Firm* — Lathrop Gage LLP (57) ABSTRACT

An oxygen generator comprising a housing and a chemical core within the housing, the chemical core being capable on ignition of producing oxygen by chemical reaction. An ignition apparatus within the housing is for igniting the chemical core, and a collection apparatus within the housing collects oxygen produced by the chemical core. The collection apparatus comprises a cooling chamber having an inlet through which oxygen produced by the chemical core enters into the cooling chamber, and an outlet through which oxygen in the cooling chamber leaves the cooling chamber. The interior of the cooling chamber has at least one wall arranged in the path of oxygen flowing from the inlet to the outlet.

11 Claims, 9 Drawing Sheets

(58) Field of Classification Search
USPC .......................................................... 422/165
See application file for complete search history.

(56) References Cited

U.S. PATENT DOCUMENTS

| | | | | |
|---|---|---|---|---|
| 5,725,834 A | * | 3/1998 | Nishii | ..................... A62B 21/00 |
| | | | | 422/126 |
| 2006/0051255 A1 | * | 3/2006 | Grudace | ................ A62B 21/00 |
| | | | | 422/120 |

FOREIGN PATENT DOCUMENTS

| WO | WO 02/098512 | 12/2002 |
|---|---|---|
| WO | WO 2004/024239 | 3/2004 |

\* cited by examiner

FIG. 8 ured in the art in a room, for example. One reason for this
OXYGEN GENERATORS

FIELD OF THE INVENTION

The present invention concerns oxygen generators. More particularly, but not exclusively, the present invention concerns portable oxygen candles that are used to provide breathable oxygen for medical use.

BACKGROUND OF THE INVENTION

Oxygen candles are well-known. Oxygen candles are devices that produce on demand a supply of oxygen by means of a chemical reaction. (The term "chemical reaction" is used herein to exclude electrolytic decomposition and other methods requiring an external source of energy.) An example of an oxygen candle is disclosed in WO 2009/030921 A2 (Molecular Products Group PLC) published 12 Mar. 2009.

A typical oxygen candle comprises a chemical core of an oxygen-containing substance, for example an alkali metal chlorate or perchlorate, in admixture with a catalyst that facilitates lower temperature decomposition of the chemical to oxygen and residual solids. The catalyst may be manganese dioxide or cobalt dioxide, for example, both of which reduce the temperature at which alkali metal chlorates decompose. The chemical core often also comprises a fuel such as iron.

A typical oxygen candle will comprise an ignition apparatus, which is used to trigger the production of oxygen by the device. The ignition apparatus may for example be a spring-loaded shaft with a head coated with a friction-ignitable substance such as phosphorus. When a supply of oxygen is required, the head of the spring-loaded shaft is driven into the surface of the chemical core. When the phosphorus on the head of the spring-loaded shaft is bought into contact with the chemical core, an exothermic reaction is generated. The exothermic reaction initiates the chemical reaction that releases the oxygen the chemical core contains. Alternatively, the ignition apparatus may be an explosive-type ignition, in which a pyrotechnic chemical reaction initiates the release of oxygen from the chemical core.

While the catalyst reduces the temperature at which the chemical reaction can occur, nevertheless the reaction is exothermic, and the exterior of the chemical core typically reaches very high temperatures of the order of 600-1200° C. For this reason the chemical core of the oxygen candle will be surrounded by insulation, and housed within a housing. Considerable efforts have been made to provide portable oxygen candles that can be safely held and used, despite the high temperatures the chemical core reaches when undergoing the chemical reaction.

It is of course desirable to reduce as much as possible the temperature of the oxygen supply provided by an oxygen candle. This is particularly the case with portable oxygen candles that are intended to provide an oxygen supply for medical purposes, in other words directly to a patient, as opposed to devices that are intended to increase the oxygen content in the air in a room, for example. One reason for this is that a medical oxygen supply will be supplied directly to the nose/mouth of the patient via an oxygen tube and face mask, so needs to be at a suitably low temperature, while a supply that is used to increase the air oxygen content will only be released generally into the air so can be at a higher temperature. Another reason is that it is desirable that standard oxygen tubing can be used, as these have a special construction that reduces the risk of them becoming blocked leading to a potential pressure increase and/or the user not receiving any oxygen at the face mask. If standard oxygen tubing can be used, special tubing does not need to be specially manufactured or stored for use with the oxygen candle. To be able to use standard oxygen tubing requires the oxygen to be supplied at a low enough temperature to not melt the standard oxygen tube.

The invention seeks to solve or mitigate some or all of the above-mentioned problems. Alternatively and/or additionally, the invention seeks to provide an improved oxygen generator.

SUMMARY OF THE INVENTION

In accordance with a first aspect of the invention there is provided an oxygen generator comprising:

a housing;

a chemical core within the housing, the chemical core being capable on ignition of producing oxygen by chemical reaction;

an ignition apparatus within the housing for igniting the chemical core;

a collection apparatus within the housing for collecting oxygen produced by the chemical core;

wherein the collection apparatus comprises a cooling chamber having an inlet through which oxygen produced by the chemical core enters into the cooling chamber, and an outlet through which oxygen in the cooling chamber leaves the cooling chamber, and wherein the interior of the cooling chamber has at least one wall arranged in the path of oxygen flowing from the inlet to the outlet.

The oxygen expands as it passes through the cooling chamber, causing it to cool. By having walls in the path of the oxygen, its passage through the cooling chamber is delayed. This gives the oxygen a longer time to expand and cool. Further, by having the walls in the path of the oxygen, it has been found that this results in more efficient cooling than is the case if the oxygen is simply made to flow along an extended path. This allows the cooling chamber to be more compact. It has also been found that the walls do not need to be sealed in order for the efficient cooling to be achieved. The use of such a cooling chamber can in certain embodiments of the invention allow a portable oxygen generator to be provided in which the oxygen passing from the outlet is sufficiently low in temperatures, for example below 70° C., that standard oxygen tubing can be fixed to the outlet and the tubing will not melt. This is advantageous as it means that special tubing does not need to be used with the oxygen generator. This is particularly advantageous for oxygen tubing, which is manufactured with a star-shaped hole in the middle so that the oxygen it supplies will not be cut off if the tubing is sharply bent. Because of its unusual construction with a star-shaped hole, special heat-resistant oxygen tubing would be particularly expensive to provide.

Preferably, the chemical core comprises metal chlorate or perchlorate. Preferably, the chemical core further comprises a catalyst and a fuel. The catalyst may be manganese dioxide or cobalt dioxide. The fuel may be iron.

Preferably, the at least one wall defines a plurality of paths from the inlet to the outlet. Advantageously, a first path and second path of the plurality of paths are arranged so that a stream of oxygen flowing along the first path is directed into a stream of oxygen flowing along the second path. The direction of the first and second paths into each other acts to slow down the movement of the oxygen in the cooling chamber. The walls may be arranged concentrically. Advantageously, the oxygen generator comprises at least a first and a second wall having gaps on opposite sides of the cooling chamber. This forces the oxygen to travel from one side of the cooling chamber to the other as it passes through the cooling chamber, so increasing the time it takes to pass through the cooling chamber.

Advantageously, the cooling chamber is formed by a depression in a first cooling chamber piece and a corresponding depression in a second cooling chamber piece. This makes the cooling chamber easy to manufacture. An O-ring may be provided between the first cooling chamber piece and the second cooling chamber piece, to provide a gas-impermeable seal. The walls in the cooling chamber can advantageously be formed by walls extending from the inner surface of first cooling chamber piece into corresponding grooves in the second cooling chamber piece. As the walls are intended to provide a single elongated path they do not need to be completely gas-impermeable, and so no special seal is required between the walls of the first cooling chamber piece and the grooves of the second cooling chamber piece. This simplifies the construction of the cooling chamber. Preferably, the inlet is in the first cooling chamber piece, and the outlet is in the second cooling chamber piece. This allows the first cooling chamber piece to be positioned with its external surface facing the chemical core, and the second cooling chamber piece to be positioned with its external surface facing the outside of the oxygen generator, providing a simple and compact construction. Advantageously, the inlet is positioned apart from the outlet. For example, the inlet may be positioned in centre of cooling chamber, and the outlet at one edge of the cooling chamber. This again forces the oxygen to travel a further distance across the cooling chamber as it passes through the cooling chamber, so increasing the time it takes to pass through the cooling chamber.

Preferably, the outlet is arranged to be receive a standard oxygen tube pressure fitting. This means standard oxygen tubing can be used. A particular advantage of this is that if an excess of pressure builds up due, for example, to the oxygen tubing being blocked, the pressure fitting will simply be forced off the outlet, so allowing the oxygen to be released.

DESCRIPTION OF THE DRAWINGS

Embodiments of the present invention will now be described by way of example only with reference to the accompanying schematic drawings of which:

FIG. 4b is a perspective view of the bottom of the first cooling chamber piece shown in FIG. 4a;

FIG. 5b is a perspective view of the bottom of the second cooling chamber piece shown in FIG. 5a;

DETAILED DESCRIPTION

An oxygen candle in accordance with a first embodiment of the invention is now described with reference to FIGS. 1 to 8.

Figure 1:
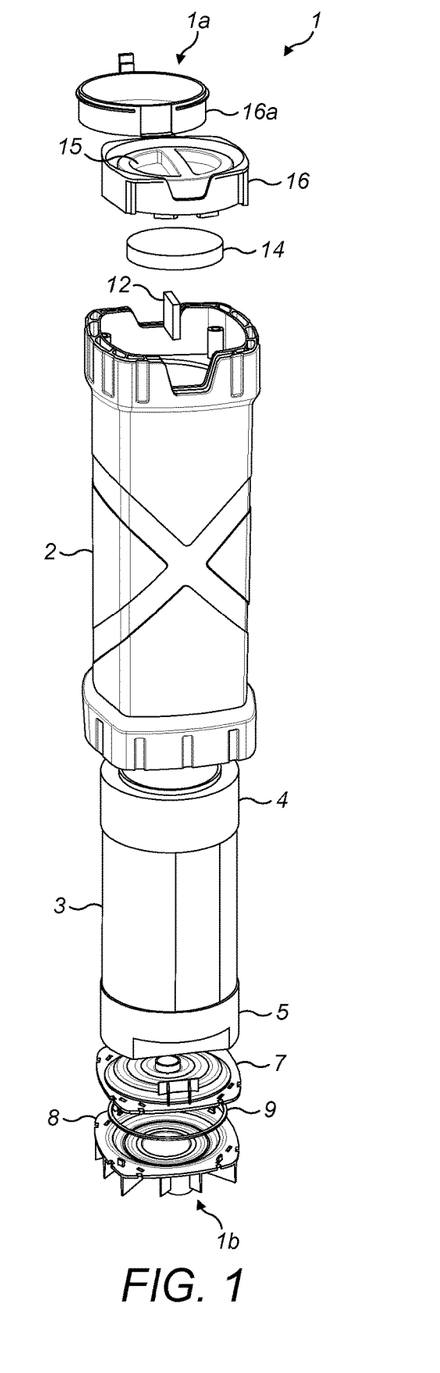
FIG. 1 is an exploded perspective view of an oxygen candle according to a first embodiment of the invention.
Figure 2:
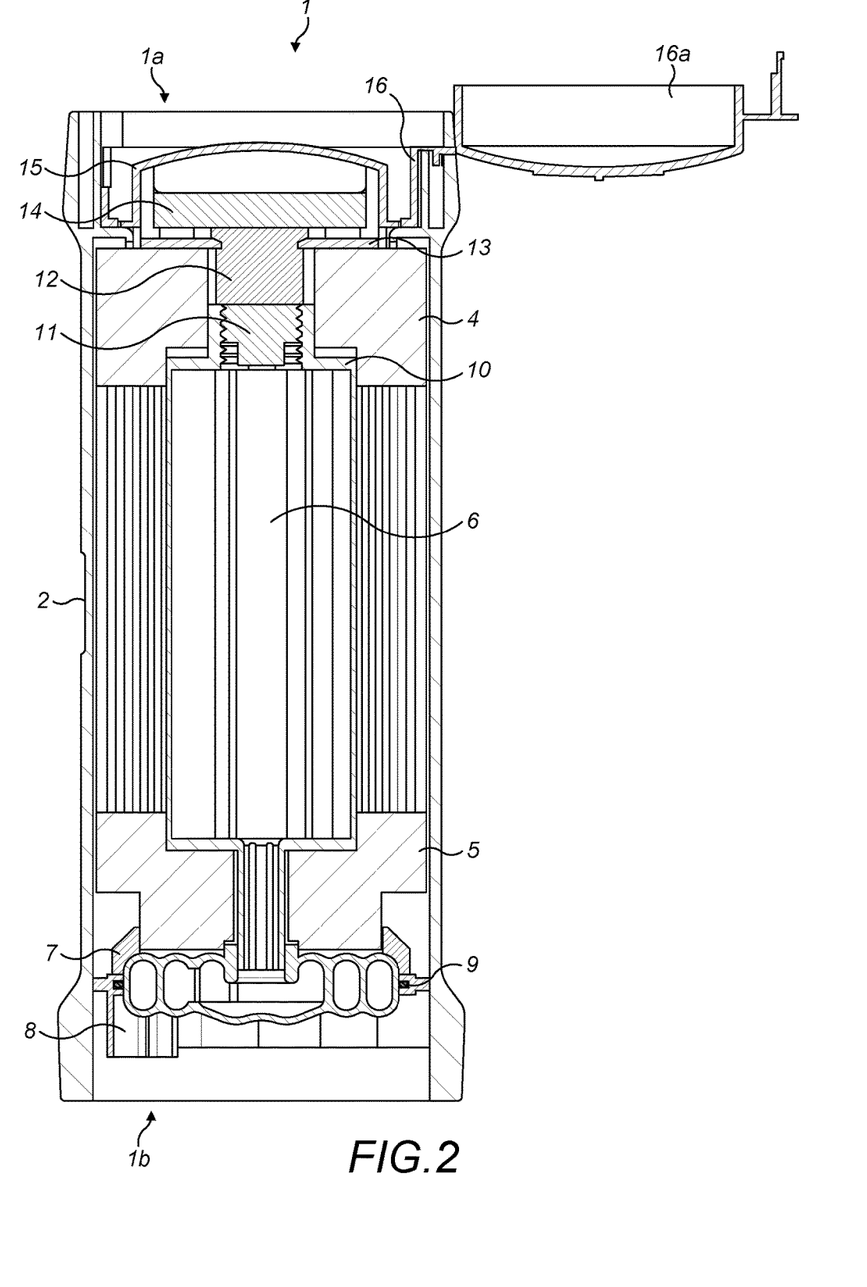
FIG. 2 is a cross-sectional view of the oxygen candle of the first embodiment.

An exploded view of the oxygen candle is shown in FIG. 1, and a cross-sectional view is shown in FIG. 2. The oxygen candle 1 comprises a tube-shaped housing 2, and has an ignition end 1a (the top end) and an oxygen-release end 1b (the bottom end).

Inside the housing 1 is a cylindrical insulating body 3, comprising top insulating block 4 and bottom insulating block 5 of solid insulating material at the top and bottom ends of the insulating body 3, with a tube formed from further insulating material between the top 4 and bottom 5 insulating blocks. A chemical core 6 for ignition to produce oxygen is positioned within the insulating body 3 between the top 4 and bottom 5 insulating blocks. Each of the top 4 and bottom 5 insulating blocks has a central passage through which gas can pass between the chemical core 6 and the exterior of the insulating body 3 at the top and bottom ends respectively.

An ignition block holder 10 is positioned at the ignition end 1a of the oxygen candle 1, within the insulating body 3 between the top insulating block 4 and the chemical core 6. An ignition block 11, described in more detail below, is positioned within the ignition block holder 10. For clarity, the chemical core 6, ignition block holder 10 and ignition block 11 are shown alone in FIG. 6. As can be seen in particular in FIG. 7, in which for clarity the ignition block holder 10 is shown alone, the ignition block holder 10 comprises a body 10a with a threaded inner surface, and at the bottom end a flange 10b.

Figure 8:
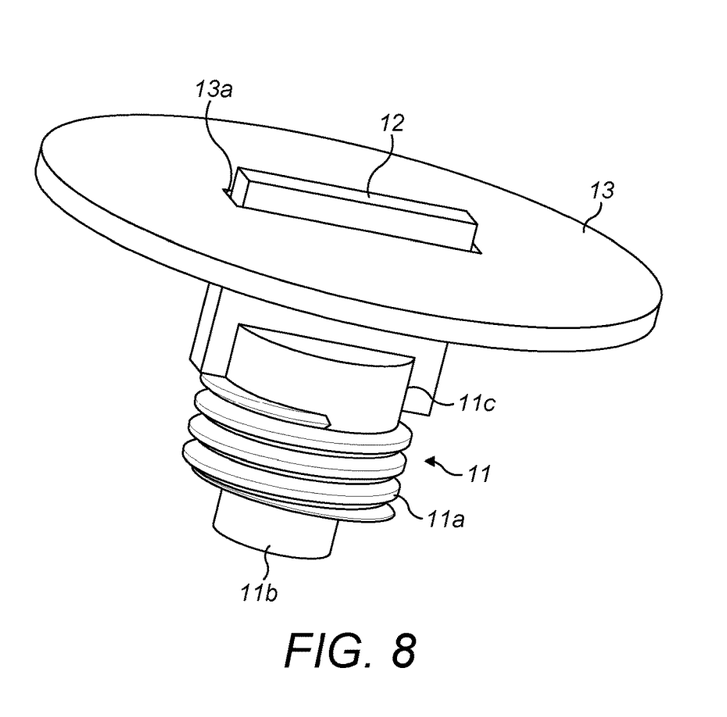
FIG. 8 is a perspective view of the ignition block shown in FIG. 6, with a thermal isolator and insulating disk of the oxygen candle of the first embodiment.

As can be seen in particular in FIG. 8, there is further at the ignition end 1a of the oxygen candle 1 a thermal isolator 12 and insulating disk 13. For clarity, the ignition block 11, thermal isolator 12 and insulating disk 13 are shown alone in FIG. 8. The ignition block 11 is made of brass, and has a threaded exterior surface 11a which engages with the threaded interior 10a of the ignition block holder 10. The bottom end of the ignition block 11 comprises an ignition layer 11b of phosphorus. The top end of the ignition block 11 comprises a slot 11c. in which is positioned a thermal isolator 12. The thermal isolator 12 is a rectangular slab of mica/polysiloxane composite containing 89% wt mica, 10% wt methyl polysiloxane, and 10% wt silicon dioxide, with dimensions roughly 20 mm by 25 mm and thickness 5 mm. The insulation disk 13 has a central slot 13a through which the thermal isolator 12 passes.

Figure 3:
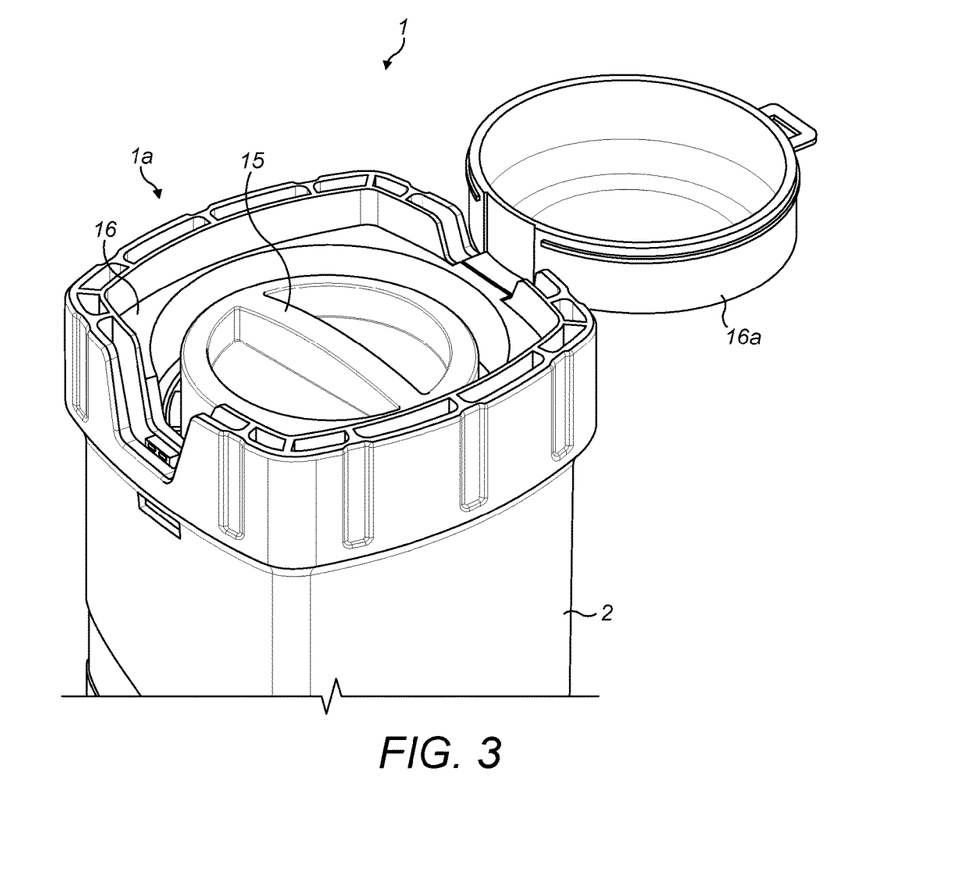
FIG. 3 is a perspective view of the ignition end of the oxygen candle of the first embodiment.
Figure 4A:
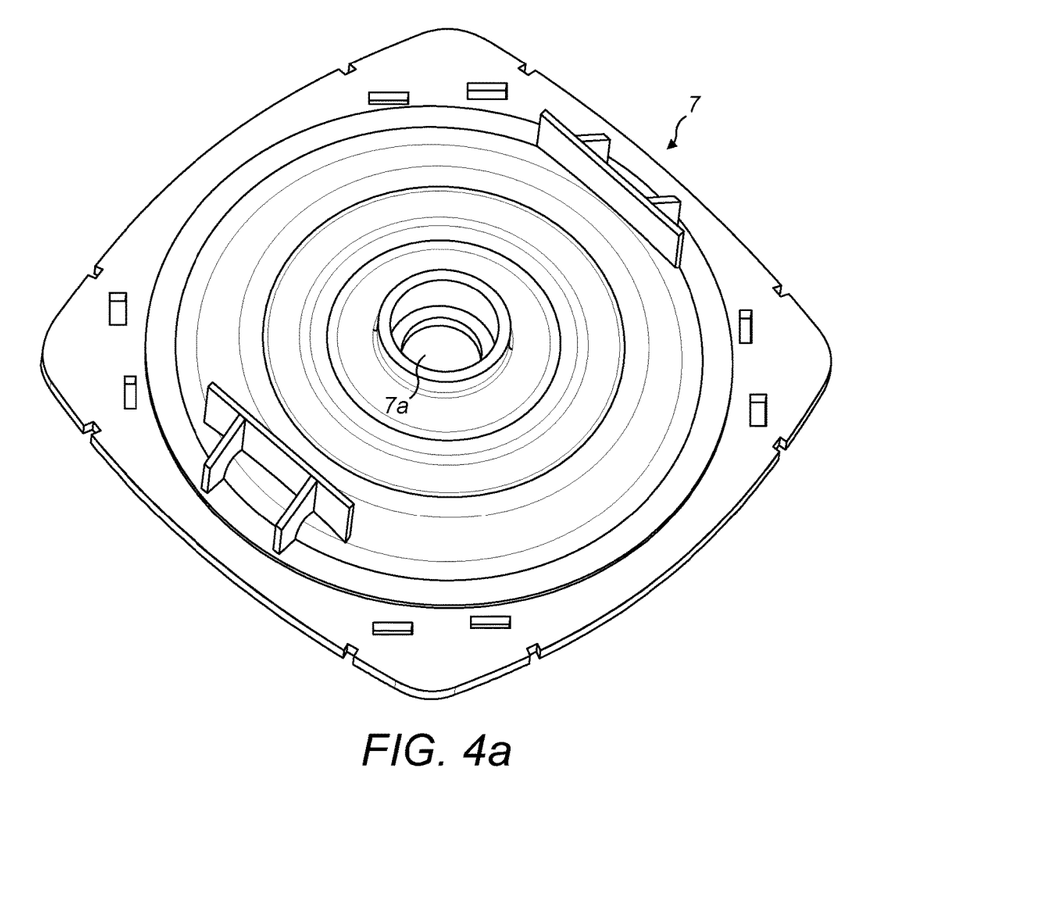
FIG. 4a is a perspective view of the top of a first cooling chamber piece of the oxygen candle of the first embodiment.
Figure 4B:
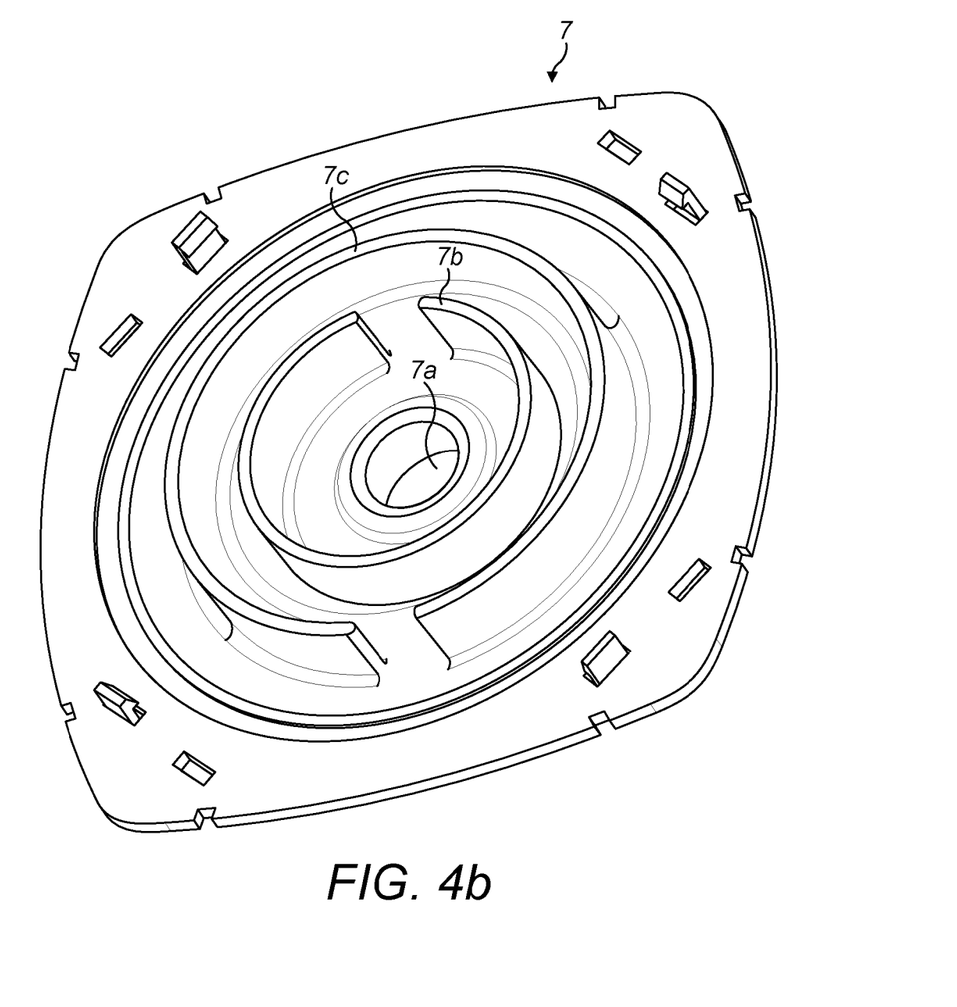

A close-up of the ignition end 1a of the oxygen candle 1 is shown in FIG. 3. An ignition handle 15 is positioned within a lid portion 16, which has a hinged lid 16a which can cover the ignition handle 16. The ignition handle 15 is circular with a bar passing diametrically across its centre, providing means by which the ignition handle 15 can be rotated by a user. As shown in FIGS. 1 and 2, the ignition handle 15 is mounted upon a circular insulation block 14. The bottom face of the circular insulation block 14 provides a slot into which the thermal isolator 12 is positioned.

At the oxygen-release end 1b of the oxygen candle 1, in contact with the bottom of the insulating body 3, is a first cooling chamber piece 7. A second cooling chamber piece 8 is positioned below the first cooling chamber piece 7. An O-ring 9 is positioned between the first cooling chamber piece 7 and second cooling chamber piece 8 to create a cooling chamber as described in more detail below. The O-ring 9 creates a gas-impervious seal between the first cooling chamber piece 7 and the second cooling chamber piece 8 at the outside edge of the cooling chamber. The first cooling chamber piece 7 is shown in more detail in FIGS. 4a and 4b. The first cooling chamber piece 7 has on the top side shown in FIG. 4a. in other words the side facing the insulating body 3, a central hole 7a. The first cooling chamber piece 7 has on the bottom side shown in FIG. 4b a circular depression, in which there is a first circular wall 7b arranged concentrically outside the hole 7a. and a second circular wall 7c arranged concentrically outside the first circular wall 7b. Each of the first circular wall 7b and second circular wall 7c has a gap, arranged respectively on opposite sides of the first cooling chamber piece 7.

Figure 5A:
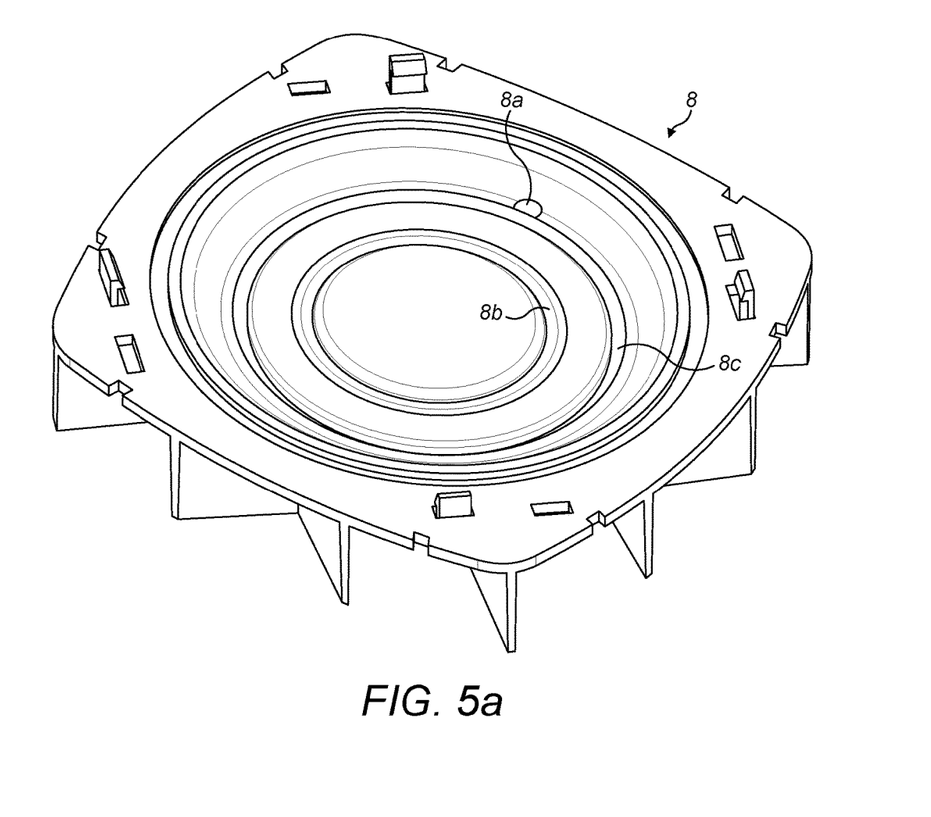
FIG. 5a is a perspective view of the top of a second cooling chamber piece of the oxygen candle of the first embodiment.
Figure 5B:
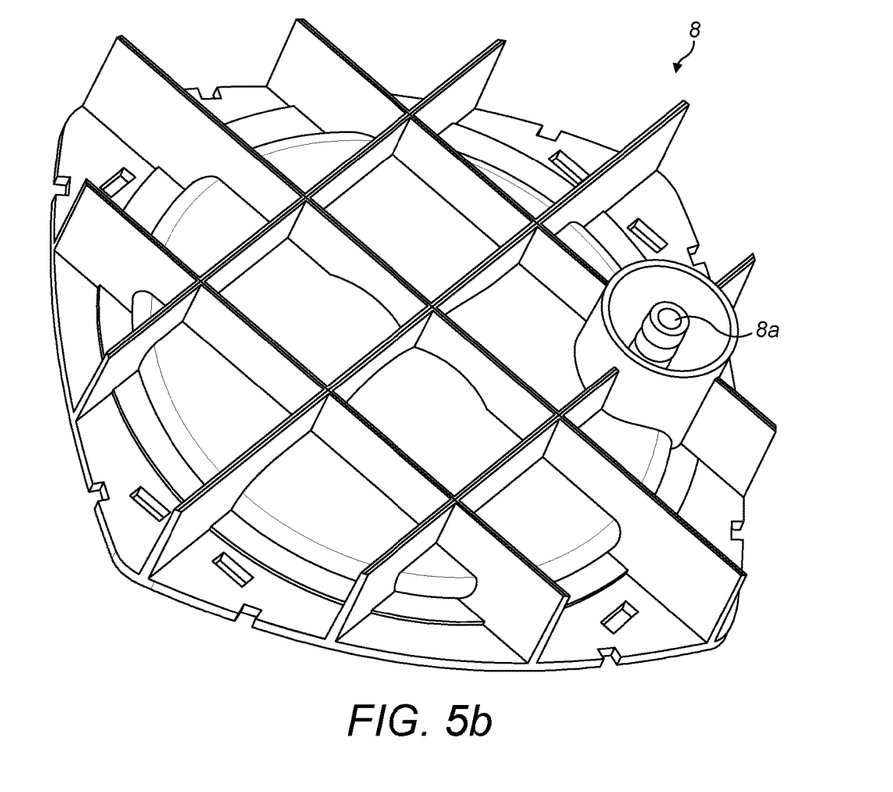
Figure 6:
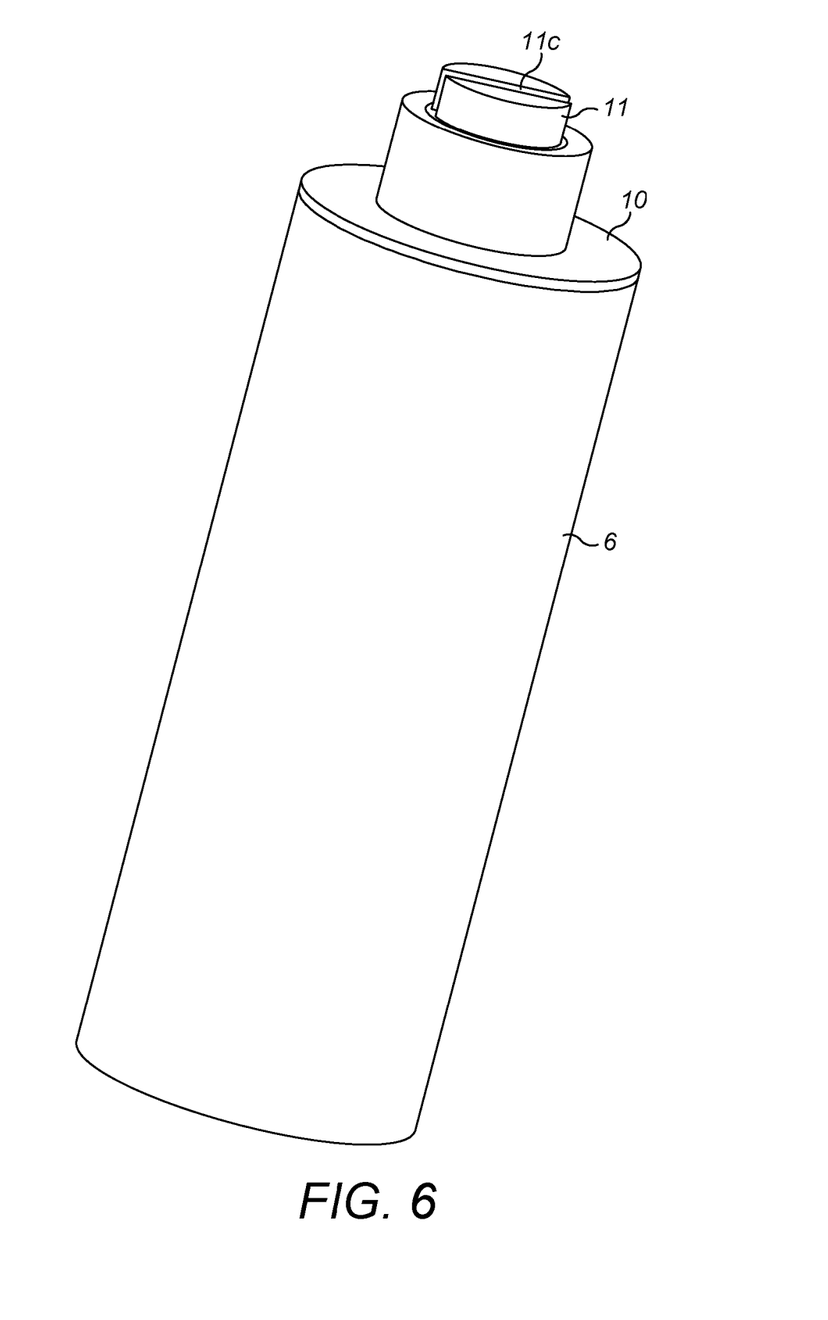
FIG. 6 is a perspective view of a chemical core, ignition block and ignition block holder of the oxygen candle of the first embodiment.
Figure 7:
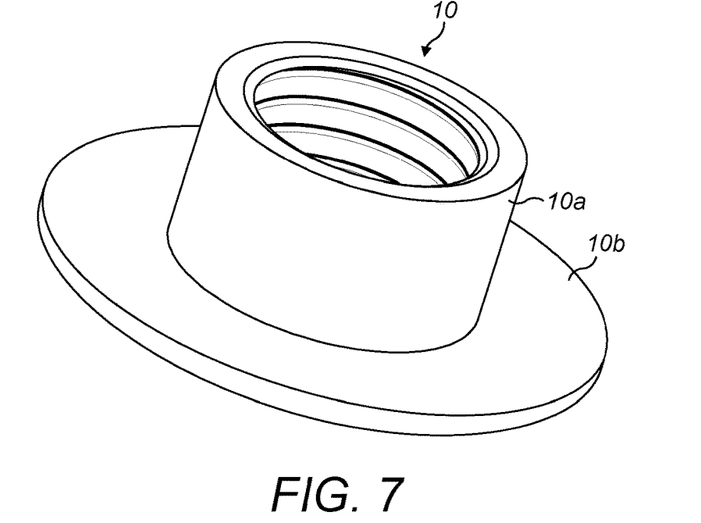
FIG. 7 is a perspective view of the ignition block holder shown in FIG. 6.

The second cooling chamber piece 8 is shown in more detail in FIGS. 5a and 5b. The second cooling chamber piece 8 has on the top side shown in FIG. 5a. in other words the side facing the first cooling chamber piece 7, a circular depression corresponding to the circular depression of the first cooling chamber piece 7. In the circular depression there is an offset hole 8a positioned towards a side of the second cooling chamber piece 8, a first circular groove 8b positioned to receive the top edge of the first circular wall 7b. and a second circular groove 8c positioned to receive the top edge of the second circular wall 7c. The offset hole 8a is positioned outside the second circular groove 8c. on the opposite side from the gap in the corresponding second circular wall 7c. The offset hole 8a of course passes through to the bottom side of the second cooling chamber piece 8 shown in FIG. 5b. The second cooling chamber piece 8 is formed on the bottom side around the offset hole 8a to provide a standard oxygen pressure valve, to receive a standard oxygen tube fitting.

Thus, as can be seen in particular in FIG. 2, the circular depressions of the first cooling chamber piece 7 and second cooling chamber piece 8 together form a circular cooling chamber, with the first circular wall 7b and second circular wall 7b being positioned between the central hole 7a in the first cooling chamber piece 7 and the offset hole 8a in the second cooling chamber piece 8.

Before use, the oxygen candle 1 will be provided with the ignition block 11 positioned within the ignition block holder 10 so that the ignition layer 11b is a suitable distance away from the chemical core 6 to prevent accidental ignition, say a distance of 10 mm. The lid 16a of the lid portion 16 will be closed, and the entire oxygen candle 1 may be provided within a material bag which can be opened at each end.

When used, oxygen tubing will be fitted to the standard oxygen pressure valve round the offset hole 8a at the oxygen-release end 1b of the oxygen candle. The oxygen tubing may be standard oxygen tubing which has a central hole of star-shaped cross-section, and may at the other end have a face mask, for example.

To ignite the oxygen candle 1, first the lid 16a of the lid portion 16 is opened to allow access to the ignition handle 15. The ignition handle 15 is then rotated in a clockwise direction. This causes the circular insulation block 14 to rotate, which in turn rotates the thermal isolator 13, which in turn rotates the ignition block 11. As the ignition block 11 is screw-threaded within the ignition block holder 10, the rotation causes the ignition block 11 to move towards the chemical core 6. After a sufficient amount of rotation the ignition layer 11b of the ignition block 11 will come into contact with the chemical core 6. The friction of the phosphorus of the ignition layer 11b rotating against the surface of the chemical core 6 will then trigger the chemical reaction of the chemical core 6.

As mentioned above, the chemical reaction causes a considerable amount of heat. However, while the thermal isolator 13 allows rotational force to be passed from the ignition handle 15 to the ignition block 11, due to its insulating properties it nevertheless only conducts a very small amount of heat. The insulation disk 13 and insulation block 14 further help prevent more than a very small amount of heat passing from the chemical core 6 to the ignition handle 15, or to the ignition end 1a of the oxygen candle generally.

As the chemical core 6 undergoes the chemical reaction, it of course releases oxygen. The oxygen is not able to pass through the insulating body 3 or the ignition end 1a of the oxygen candle 1, but is instead forced through the central hole 7a of the first cooling chamber piece 7 into the cooling chamber formed by the circular depressions in the first cooling chamber piece 7 and second cooling chamber piece 8. The oxygen first collects in the centre of the cooling chamber within the first circular wall 7b. It then passes through the gap in the first circular wall 7b into the area of the cooling chamber between the first circular wall 7b and second circular wall 7c. The oxygen then travels between the first circular wall 7b and second circular wall 7c in both directions from the gap in the first circular wall 7b. The oxygen then passes through the gap in the second circular wall 7c into the area of the cooling chamber between the second circular wall 7c and the outside edge of the chamber, as defined by O-ring 9 between the first cooling chamber piece 7 and second cooling chamber piece 8. Similarly to before, the oxygen then travels between the second circular wall 7c and the outside edge of the cooling chamber in both directions from the gap in the second circular wall 7c. until it reaches the offset hole 8a. It then passed through the offset hole 8a into the oxygen tubing.

As the oxygen travels through the cooling chamber from the central hole 7a to the offset hole 8a it expands, causing it to reduce in temperature. Importantly, the first circular wall 7b and second circular wall 7c do not provide a single extended path through the cooling chamber. Rather, after passing through each gap the oxygen travels in two streams in opposite directions to the other side of the cooling chamber, where the streams meet and pass through the next gap or offset hole 8a. The meeting of the streams of oxygen arriving from opposite directions slows the passage of the oxygen through the cooling chamber, increasing the time the oxygen has to expand and cool before leaving the cooling chamber.

Whilst the present invention has been described and illustrated with reference to particular embodiments, it will be appreciated by those of ordinary skill in the art that the invention lends itself to many different variations not specifically illustrated herein.

The invention claimed is:

1. An oxygen generator comprising:
   a housing;
   a chemical core within the housing, the chemical core being capable on ignition of producing oxygen by chemical reaction;
   an ignition apparatus within the housing for igniting the chemical core;
   a collection apparatus within the housing for collecting oxygen produced by the chemical core;

wherein the collection apparatus comprises:
  a cooling chamber having an inlet through which oxygen produced by the chemical core enters into the cooling chamber, and an outlet through which oxygen in the cooling chamber leaves the cooling chamber,
and wherein the interior of the cooling chamber has at least one wall arranged in the path of oxygen flowing from the inlet to the outlet.

2. An oxygen generator as claimed in claim 1, wherein the chemical core comprises metal chlorate or perchlorate.

3. An oxygen generator as claimed in claim 1, wherein the chemical core further comprises a catalyst and a fuel.

4. An oxygen generator as claimed in claim 1, wherein the at least one wall defines a plurality of paths from the inlet to the outlet.

5. An oxygen generator as claimed in claim 4, wherein a first path and second path of the plurality of paths are arranged so that a stream of oxygen flowing along the first path is directed into a stream of oxygen flowing along the second path.

6. An oxygen generator as claimed in claim 1, wherein the cooling chamber comprises a plurality of walls that are arranged concentrically.

7. An oxygen generator as claimed in claim 1, comprising at least a first and a second wall having gaps on opposite sides of the cooling chamber.

8. An oxygen generator as claimed in claim 1, wherein the cooling chamber is formed by a depression in a first cooling chamber piece and a corresponding depression in a second cooling chamber piece.

9. An oxygen generator as claimed in claim 8, wherein the inlet is in the first cooling chamber piece, and the outlet is in the second cooling chamber piece.

10. An oxygen generator as claimed in claim 1, wherein the inlet is positioned apart from the outlet.

11. An oxygen generator as claimed in claim 1, wherein the outlet is arranged to be receive a standard oxygen tube pressure fitting.

* * * * *